US011390262B2

(12) United States Patent
Brandt et al.

(10) Patent No.: US 11,390,262 B2
(45) Date of Patent: Jul. 19, 2022

(54) DEVICE AND METHOD FOR SUPERVISING AND MODIFYING VEHICLE OPERATION

(71) Applicant: Polaris Industries Inc., Medina, MN (US)

(72) Inventors: Brian E. Brandt, Roseau, MN (US); Scott D. Taylor, Blaine, MN (US); Karl J. Grajkowski, Hudson, WI (US); Russell G. Olsen, Taylors Falls, MN (US); David G. Hille, Bush Prairie, WA (US); Trevor J. LaJoye, Lindstrom, MN (US)

(73) Assignee: Polaris Industries Inc., Medina, MN (US)

( * ) Notice: Subject to any disclaimer, the term of this patent is extended or adjusted under 35 U.S.C. 154(b) by 784 days.

(21) Appl. No.: 15/836,223

(22) Filed: Dec. 8, 2017

(65) Prior Publication Data

US 2018/0170342 A1    Jun. 21, 2018

Related U.S. Application Data

(60) Provisional application No. 62/434,857, filed on Dec. 15, 2016.

(51) Int. Cl.
*B60W 10/04*     (2006.01)
*B60W 40/02*     (2006.01)
(Continued)

(52) U.S. Cl.
CPC ............ *B60W 10/04* (2013.01); *B60W 40/02* (2013.01); *H04W 4/40* (2018.02); *B60T 2250/04* (2013.01);
(Continued)

(58) Field of Classification Search
CPC ................ B60W 10/04; B60W 40/02; B60W 2050/0078; B60W 2050/146; B60T 2250/04; G09B 29/10
(Continued)

(56) References Cited

U.S. PATENT DOCUMENTS 7,711,468 B1    5/2010  Levy
9,892,573 B1 *  2/2018  Hsu-Hoffman ........ G07C 5/085
(Continued)

OTHER PUBLICATIONS

International Search Report of the International Searching Authority, dated Mar. 14, 2018 for related International patent application No. PCT/US2017/065502; 10 pages.
(Continued)

*Primary Examiner* — Anne Marie Antonucci
(74) *Attorney, Agent, or Firm* — Faegre Drinker Biddle & Reath LLP

(57) ABSTRACT

A vehicle control system is disclosed for modifying vehicle operation and includes an engine control unit having at least one processor. A vehicle network is provided as well as a first handheld wireless device having a GPS module, a local wireless communication module, and a distance wireless communication module. A gauge has a wireless communication module operable to communicate with the first handheld wireless device and at least one display for communicating information to a user regarding vehicle operating parameters. Memory accessible by the processor and memory having software stored thereon are provided, the software being configured for execution by the processor and including instructions for providing a boundary map within which the vehicle may operate under normal operating conditions. The vehicle is placed in a degraded operating mode if the vehicle moves outside of the boundary.

29 Claims, 2 Drawing Sheets

(51) Int. Cl.
*H04W 4/40* (2018.01)
*B60W 50/00* (2006.01)
*B60W 50/14* (2020.01)
*G09B 29/10* (2006.01)

(52) U.S. Cl.
CPC ............. *B60W 2050/0075* (2013.01); *B60W 2050/146* (2013.01); *B60W 2556/50* (2020.02); *G09B 29/10* (2013.01)

(58) Field of Classification Search
USPC .......................................................... 701/1
See application file for complete search history.

(56) References Cited

U.S. PATENT DOCUMENTS

| | | | |
|---|---|---|---|
| 2009/0079555 A1* | 3/2009 | Aguirre | G07C 5/008 340/441 |
| 2010/0094500 A1 | 4/2010 | Jin | |
| 2011/0297463 A1 | 12/2011 | Grajkowski | |
| 2014/0279297 A1* | 9/2014 | Morgan | G07C 5/008 705/28 |
| 2015/0262208 A1* | 9/2015 | Bjontegard | G06Q 30/0205 705/7.31 |
| 2016/0180721 A1 | 6/2016 | Otulic | |
| 2017/0061812 A1* | 3/2017 | Lahav | B60W 40/09 |
| 2017/0136875 A1* | 5/2017 | Logan | B60K 28/10 |
| 2018/0009416 A1* | 1/2018 | Maiwand | G07C 9/00182 |

OTHER PUBLICATIONS

Written Opinion of the International Searching Authority, dated Mar. 14, 2018 for related International patent application No. PCT/US2017/065502; 13 pages.

International Preliminary Report on Patentability issued by the International Preliminary Examining Authority, dated Feb. 13, 2019, for International Patent Application No. PCT/US2017/065502; 22 pages.

Office Action issued by the Canadian Intellectual Property Office, dated Jul. 29, 2020, for Canadian Patent Application No. 3,046,712; 5 pages.

* cited by examiner ent, wireless communication module 18 operates according to the Wi-Fi protocol.

DEVICE AND METHOD FOR SUPERVISING AND MODIFYING VEHICLE OPERATION

CLAIM OF PRIORITY

This application claims priority from U.S. Provisional Application Ser. No. 62/434,857 filed Dec. 15, 2016, the subject matter of which is incorporated herein by reference.

FIELD OF THE DISCLOSURE

The present disclosure relates generally to supervising and modifying vehicle operation. The present disclosure relates more specifically to devices and methods allowing a supervisor to alter operation of a vehicle expected to be under the control of a supervisee and for supervising such use.

BACKGROUND

Recreational Vehicles, such as ATV's, four-wheelers, and the like provide a degree of independence in movement. The off-road venue, reduced speed capacity (relative to on-road cars), and other factors lend themselves to providing a legal and appropriate venue for drivers/operators that are not allowed to operate on-road cars. One such group of drivers/operators are those who are below the age required to have a driver's license/driver's permit. Many individuals, such as parents, deem it prudent to supervise and/or constrain vehicle operation controlled by such other users.

Accordingly, what is needed is a device and method for facilitating monitoring of vehicle use and for allowing alterations in vehicle capability.

In a first embodiment of the invention, a vehicle control system for modifying vehicle operation is disclosed as including an engine control unit having at least one processor; a vehicle network; a first handheld wireless device having a GPS module, a local wireless communication module, and a distance wireless communication module; a gauge having a wireless communication module operable to communicate with the first handheld wireless device and at least one display for communicating information to a user regarding vehicle operating parameters; and a memory accessible by the processor and memory having software stored thereon, the software being configured for execution by the processor and including instructions for providing a boundary map within which the vehicle may operate under normal operating conditions, whereby when GPS module is within the proscribed boundary area, first handheld wireless device communicates to the engine control unit and sends a signal indicating compliance with the boundary condition.

In another embodiment of the invention, a method is disclosed of controlling and modifying vehicle operation, comprising the steps of providing an engine control unit having at least one processor; providing a vehicle network; providing a first handheld wireless device having a GPS module, a local wireless communication module, and a distance wireless communication module; providing a gauge having a wireless communication module operable to communicate with the first handheld wireless device; providing at least one display for communicating information to a user regarding vehicle operating parameters; providing a memory accessible by the processor and memory having software stored thereon, the software being configured for execution by the processor; providing a boundary map on the software within which the vehicle may operate under normal operating conditions; and entering a degraded vehicle mode that in some way limits operation of vehicle when the GPS module is not within the proscribed boundary area.

In yet another embodiment, a vehicle control system for modifying vehicle operation, comprises an engine control unit having at least one processor; a vehicle network; a first handheld wireless device having a GPS module, a local wireless communication module, and a distance wireless communication module; a gauge having a wireless communication module operable to communicate with the first handheld wireless device and at least one display for communicating information to a user regarding vehicle operating parameters; and a memory accessible by the processor and memory having software stored thereon, the software being configured for execution by the processor and including instructions for providing a boundary map within which the vehicle may operate under normal operating conditions, whereby the vehicle enters a degraded vehicle mode that in some way limits operation of vehicle when the GPS module is not within the proscribed boundary area.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
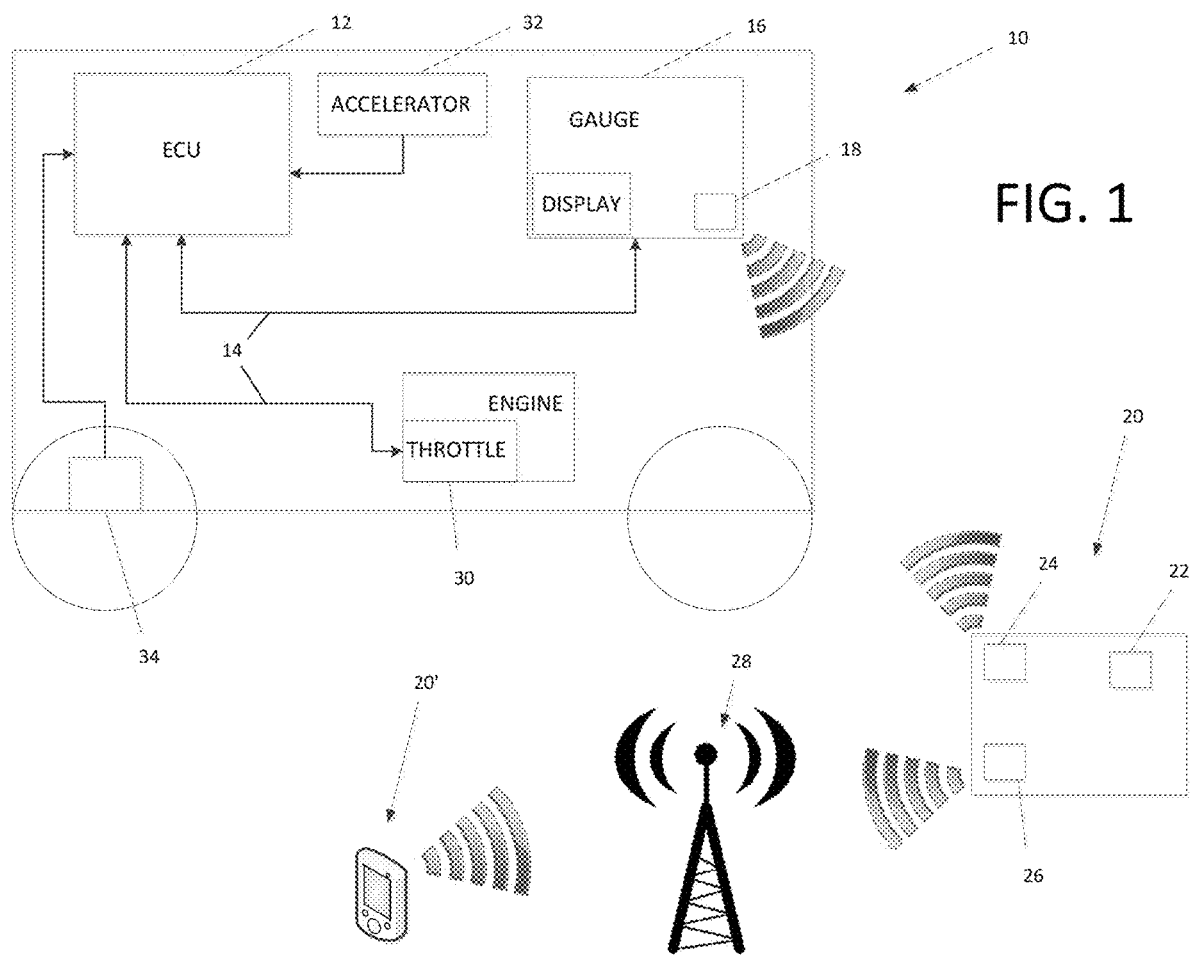
FIG. 1 is a schematic showing an exemplary vehicle control system and environment.

FIG. 1 shows a vehicle control system 10. System 10 includes an electronic control unit such as an engine control unit (ECU) 12, controller area network (CAN) 14, gauge 16, and various other controllers and devices coupled to the CAN 14. ECU 12 includes at least one processor operable to interpret instructions to direct operation of the vehicle. Controller Area Network (CAN bus) 14 is a vehicle bus standard designed to allow microcontrollers and devices to communicate with each other in applications without a host computer. Gauge 16 is illustratively coupled to ECU 12 via CAN 14. In one embodiment, gauge 16 includes one or more displays that communicate information to a user regarding one or more vehicle operating parameters. In other embodiments, the smartphone could act as the display. Gauge 16 further includes a wireless communication module 18. In one embodiment, wireless communication module 18 operates according to the Bluetooth protocol. In another embodiment, wireless communication module 18 operates over Wi-Fi, or other wireless protocols.

Wireless communication module 18 is operable to communicate with a wireless device, in this embodiment a handheld wireless device 20. In one embodiment, wireless device 20 is a smartphone. Wireless device could be any wireless device such as a tablet or laptop. Smartphone 20 illustratively includes a GPS module 22, a local wireless communication module 24, and a distance wireless communication module 26. GPS module 22 is a standard GPS module that is able to output information regarding the location of the device. Local wireless communication module 24 is similar to wireless communication module 18 and illustratively operates using the Bluetooth standard. Distance wireless communication module 26 is illustratively a module that allows for cellular communication over any known protocol, including voice and data protocols. As such, distance wireless communication module 26 is able to communicate with cellular communication systems, such as those including antennae 28. Likewise, smartphone 20 is able to communicate with other smartphones 20'.

Wireless device 20, 20' is further operable to run one or more applications (app). One such application is an application designed to specifically interface with vehicle control system 10.

Geofencing

In one embodiment, phone 20 is communicatively linked to vehicle 10 (via Bluetooth or otherwise) and the user of the vehicle carries the phone while operating vehicle 10. In such an example, access to the application on phone 20 for interfacing with vehicle 10 is selectively restricted, such as by a password or otherwise. It should be appreciated that such restriction can be to the application as a whole or to individual features. The application provides an interface for establishing a boundary. In one embodiment, the application provides a map interface. A user, such as a parent, is able to draw on the map to establish the boundary (a geofence). It should be appreciated that in certain embodiments, setting boundaries is limited to the smartphone 20 in Bluetooth connection with vehicle 10. In other embodiments, boundaries can be set from a distance, such as via the application on smartphone 20'. In the instance of being set from a distance, smartphone 20' is linked via the application with smartphone 20. Embodiments are further envisioned where access to setting the boundary within an application is a password protected function such that a supervisor can set the boundary and a supervisee who does not know the password cannot alter the set boundary. It should also be understood that there could be multiple boundaries defined as well as boundaries within boundaries. For example, a main boundary in which the rider may access is defined, where other boundaries within the main boundary are also defined, such as around lakes or ponds and the like. Thus, the proscribed area may be inside of a boundary or external to a boundary.

Smartphone 20 thereby has knowledge of the proscribed boundary area, and has knowledge of its own location via GPS module 22. When GPS module 22 is within the proscribed boundary area, smartphone 20 communicates to ECU 12 (via gauge 16, via wireless communication module 18) and sends a signal indicating compliance with the boundary condition. For so long as ECU 12 continues to receive the indication of compliance, ECU 12 continues normal operation of vehicle 10. In certain embodiments, ECU 12 periodically checks for the indication of compliance. If the indication of compliance is not received by ECU 12, ECU 12 enters a degraded mode that in some way limits operation of vehicle 10. In one embodiment, the degraded mode is a mode that lowers a maximum speed that the vehicle is allowed to power the vehicle to attain. In some embodiments, the lowered speed may be zero. Also, it should be appreciated that in certain examples, a lack of receiving the compliance signal at ECU 12 can be caused by 1) the vehicle (the smartphone 20 and its GPS module) leaving the boundary area such that no compliance signal is authored, 2) the smartphone 20 being shut off or losing power such that smartphone 20 is unable to author the compliance signal, and/or 3) smartphone 20 being separated from wireless communication module 18 such that communication therewith is lost.

When ECU 20 is unable to ascertain that the vehicle is within the geofence, ECU 12 maintains vehicle 10 operation in the degraded mode until the compliance signal is again ascertained. Once ECU 12 again acquires the report of compliance, (such as via vehicle 10 being back within the boundary or communication links being restored, the ECU 12 instructs resumption of the non-degraded state (i.e. resumption of desired speed capability where the desired speed capability can be less than the full capability of the vehicle 10, if so set by the supervisor/parent as discussed below).

In one embodiment, ECU 12 enforces a degraded mode by limiting a signal sent to control a position of a throttle body 30. Vehicle 10 operates such that accelerator 32 (such as a thumb lever, twist throttle, or otherwise) outputs an electric signal that is representative of its setting. Such a setup is commonly referred to as "drive by wire." In other embodiments, the setting of accelerator 32 is communicated by a bowden cable or the like. Regardless of the method of communication employed by accelerator 32, the setting of the accelerator 32 is communicated to ECU 12. In the degraded mode, ECU 12 imposes a maximum setting for throttle 30 such that when a received setting of accelerator 32 would normally call for a setting of throttle 30 above the set (degraded) maximum, ECU 12 instead only calls for the degraded maximum setting of throttle 30.

In one embodiment, ECU 12 operates using an operating system such as that described in U.S. Pat. No. 8,534,397, the disclosure of which is incorporated herein by reference. In one embodiment, the speed of vehicle 10 is determined by wheel speed sensor 34 and reported to ECU 12. As such, the setting of throttle 30 that is used to limit speed is not a predetermined static throttle setting, but rather is a dynamic setting that is at least partially a function of the signal received from wheel speed sensor 34. For example, if vehicle 10 is going uphill, its speed would be slower for a given throttle position relative to traversing flat terrain. Thus, the enforcement of speed is based upon a detected actual speed of vehicle 10.

While the above speed control is discussed with respect to controlling throttle, it should be appreciated that other embodiments are envisioned that control speed by monitoring and controlling engine air, fuel, and spark supply to impact available torque.

Event Alert

In one embodiment, vehicle 10 is configured to send data or an alert to remote smartphone 20' (via smartphone 20) or other chosen remote device. Accordingly, in certain embodiments, only data is sent to smartphone 20 and any alerts are generated by smartphone 20. Using the distance wireless communication module 26 of smartphone 20, a predetermined message via email, text, application specific communication, or whatever they chose upon the occurrence of a preset event. Such events can include a detection of a boundary crossing, attaining a given speed, vehicle inaction for a given amount of time, or any other detectable event associated with vehicle 10 and/or smartphone 20. Additionally, gauge 16, smartphone 20, or other element optionally includes a button to issue an alert.

Tracking

In one embodiment, the application running on remote phone 20' includes a map and provides an indication of the location of vehicle 10 (smartphone 20) on that map. As such, a supervisor (parent) can look at the map and see where the supervisee (child) is located. In should be appreciated that smartphone 20' may be a smartphone linked to another vehicle (such as a parent's vehicle). In one embodiment, the map and location of vehicle 10 may be displayed on a gauge 16 of the supervisor vehicle rather than on phone 20'. In one embodiment, the supervisee can't see the map or see the location of the supervisor but the supervisor can look and see the location of the supervisee vehicle 10.

Additionally, it should be appreciated that the ability of the tracking function to operate is dependent upon the phone 20 remaining on and powered. The supervisee can't stop it or shut it off from within the application on smartphone 20. If the supervisee shuts phone 20 off or the phone loses power or connection with vehicle 10 (gauge 16) it would trigger an alert at phone 20'. Thus the supervisee can't shut off phone 20 or leave it somewhere and ride off without such an event reporting back to the supervisor phone 20'.

In one embodiment, this tracking feature is a subset of other tracking features available. Such additional tracking features are disclosed in U.S. Provisional Application Ser. No. 62/293,471, titled "RECREATIONAL VEHICLE GROUP MANAGEMENT SYSTEM" filed Feb. 10, 2016, the disclosure of which is incorporated herein by reference.

Lockout

In one embodiment, vehicle 10 allows for a code to be set to selectively lock and unlock operation thereof. This feature allows for a code to be entered to "lock" the vehicle. Such a code can be entered via gauge 16, via smartphone 20, 20'. When the code has been entered to lock the vehicle, the locked state is stored in ECU 12. Attempts to start the vehicle, including those using a key for the vehicle, are unsuccessful. One embodiment causes providing an indication of the locked state, such as by gauge 16, smartphone 20, 20' (such as via the application), or otherwise. to start and operate the vehicle. Once the code is entered, the vehicle is unlocked and able to be started via normal means. Once the vehicle is unlocked it stays unlocked until a user actively locks it again.

Ride Stats

ECU 12 has access to memory (onboard or on smartphone 20, 20' via app) that records information regarding operation of vehicle 10. Examples of such information include, how far the vehicle has travelled, how fast the vehicle travelled, how long the vehicle was stopped at various locations.

Speed Control

Figure 2:
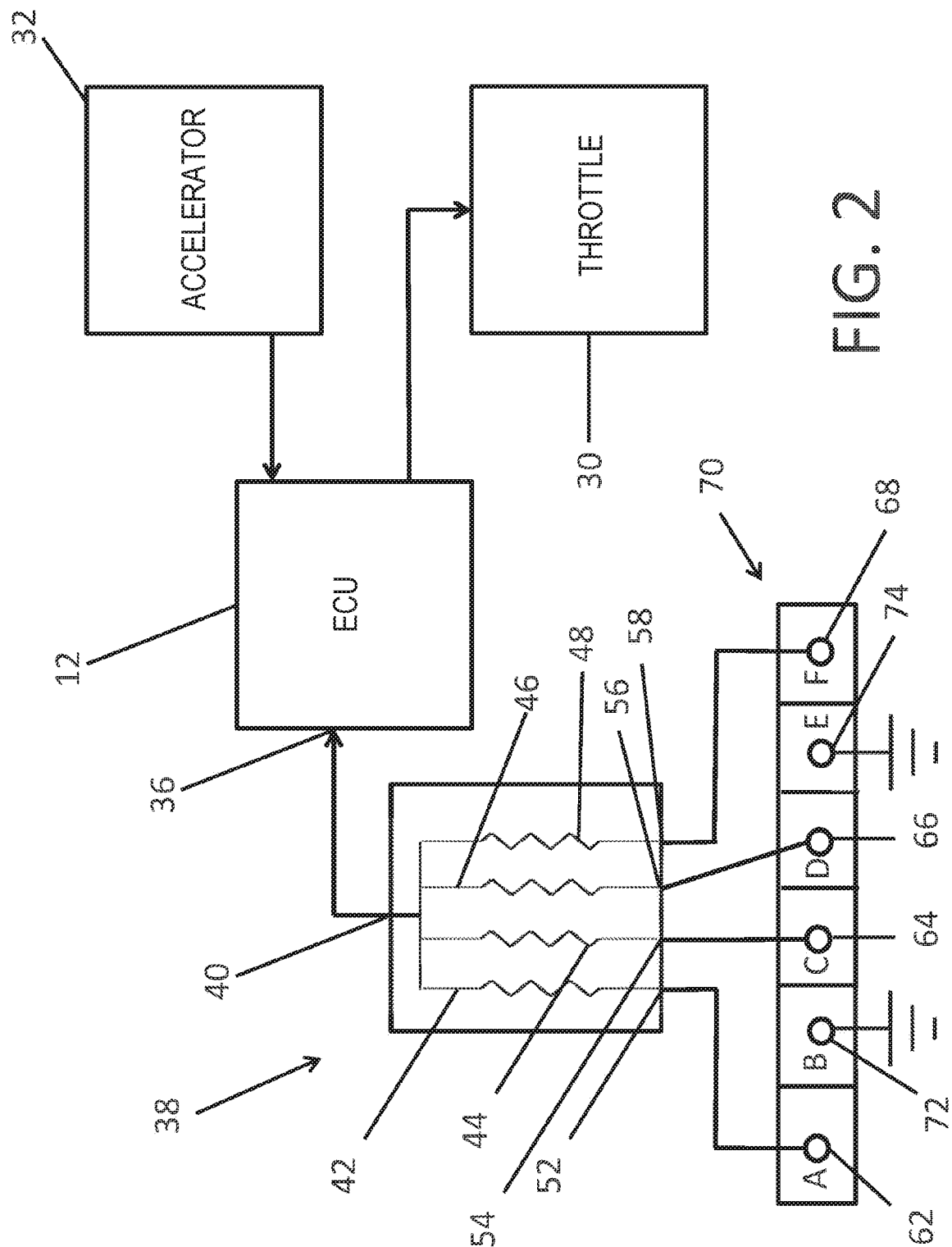
FIG. 2 is an exemplary speed setting device that is part of the vehicle control system of FIG. 1.

With reference to FIG. 2, a device for setting operational speed limits is shown. As previously noted, ECU 12 is in communication with accelerator 32 and throttle body 30. ECU 12 further includes a voltage output 36. Voltage output 36 provides a constant voltage source. A current detector is also present at output 36 to monitor the current being supplied by output 36. Speed setting device 38 includes an input 40 coupled to output 36, four resistors (42, 44, 46, 48) coupled to input 40, and four outputs (52, 54, 56, 58) coupled to respective resistors (42, 44, 46, 48). The outputs (52, 54, 56, 58) are coupled to respective lugs (62, 64, 66, 68) of jumper housing 70. Jumper housing 70 further includes at least one grounded lug(s) 72, 74.

In operation, one or more jumpers (not shown) such as wires or other electrically conductive elements are provided that can couple lugs (62, 64, 66, 68) to grounded lug(s) 72, 74. Four resistors (42, 44, 46, 48) are each of a different resistive value (Ohms). When a user attaches a jumper between a grounded lug 72, 74 and another lug 62, 64, 66, 68, doing so creates a path to ground through one of resistors 42, 44, 46, 48. In that each resistor has a different resistance, the current sensed at output 36 differs depending on the setting of the jumper. ECU 12 thus takes the detected current value and uses that as a setting indicator. The shown jumper housing 70 illustratively provides five settings (each of lugs 62, 64, 66, 68 coupled to ground providing one, and a setting indicated by no lug coupled to ground). In one embodiment, the highest setting allows operation of vehicle 10 at up to thirty miles per hour and the lowest setting (for example, the setting where no lug is coupled to ground) is ten miles an hour. Alternatively, the lugs 72, 74 could be coupled to a DC voltage, such as 3-5 volts.

Embodiments are also envisioned where a speed control is implemented via an application on smartphone 20. In such an embodiment, smartphone 20 communicates with ECU 12 to obtain a current maximum speed setting held in ECU 12. Smartphone 20 can then send one or more signals to increment the speed setting (increase or decrease). ECU 12 receives such signals and then increments the setting therein, as appropriate. The ability to send an incrementing signal is illustratively a password protected feature within the application on smartphone 20 such that a supervisor can alter the setting but a supervisee who does not know the password cannot. In the provided embodiment, a speed setting within ECU that is set by using the application on smartphone 20 (or 20') supersedes any speed setting implemented by speed setting device 38.

Accelerator Maps

In addition to setting upper speed limits, embodiments are envisioned where the setting of jumper housing 70 also impacts how ECU 12 defines the relationship between the position of accelerator 32 and the position of throttle body 30. This relationship is generally referred to as a "pedal map." In one embodiment, jumper settings having a lower maximum speed are paired with less "aggressive" pedal maps. The "aggressiveness" of a pedal map is generally defined by the amount of throttle body movement that is defined for a given amount of accelerator movement. Similarly, jumper settings having a higher maximum speed are paired with more aggressive pedal maps. Still further, the higher speed settings can be paired with logarithmic pedal maps whereas lower speeds can be paired with linear or exponential maps.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle control system for modifying vehicle operation, comprising:
an electronic control unit having at least one processor;
a vehicle network;

a first wireless device having a GPS module, a local wireless communication module, and a distance wireless communication module;

a wireless communication module operable to communicate with the first wireless device; and a memory accessible by the processor and memory having software stored thereon, the software being configured for execution by the processor and including instructions for providing at least one boundary map inside of which the vehicle operates under a first operating condition, whereby when the GPS module is inside the at least one boundary map, the first wireless device communicates to the electronic control unit and sends a signal indicating compliance with a boundary condition of the at least one boundary map, wherein the first operating condition is a normal vehicle operating condition.

2. The vehicle control system of claim 1, further comprising a gauge having the wireless communication module, wherein the gauge comprises at least one display for communicating information to a user regarding vehicle operating parameters.

3. The vehicle control system of claim 1, wherein when the GPS module is outside of the at least one boundary map, first wireless device communicates to the electronic control unit and the electronic control unit enters a degraded mode that in some way limits operation of vehicle.

4. The vehicle control system of claim 3, wherein the degraded mode is a predetermined maximum speed limit.

5. The vehicle control system of claim 4, wherein the electronic control unit controls a throttle setting on the vehicle to limit speed.

6. The vehicle control system of claim 1, wherein the software is an application provided on the wireless device.

7. The vehicle control system of claim 6, wherein the first wireless device is a first smartphone.

8. The vehicle control system of claim 1, wherein the electronic control unit operates the vehicle according to a second operating condition that is different than the first operating condition when the electronic control unit is unable to ascertain that the vehicle is inside the at least one boundary map.

9. A method of controlling and modifying vehicle operation, comprising the steps of:

providing an electronic control unit having at least one processor;

providing a vehicle network;

providing a first wireless device having a GPS module, a local wireless communication module, and a distance wireless communication module;

providing a wireless communication module operable to communicate with the first wireless device;

providing a memory accessible by the processor and memory having software stored thereon, the software being configured for execution by the processor;

providing a boundary map on the software inside of which the vehicle operates under normal operating conditions; and entering a degraded vehicle mode that in some way limits operation of vehicle when the GPS module is outside the boundary map.

10. The method of claim 9, wherein a signal is sent indicating compliance with the boundary map when the GPS module is inside the boundary map.

11. The method of claim 9, wherein the first wireless device is provided as a smartphone.

12. The method of claim 9, further comprising the step of providing at least one display for communicating information to a user regarding vehicle operating parameters.

13. The method of claim 12, wherein the display is provided on a gauge.

14. The method of claim 12, wherein the first wireless device is provided as a smartphone.

15. The method of claim 14, wherein the display is provided on the smartphone.

16. The method of claim 9, wherein the software is provided on a smartphone app.

17. The method of claim 16, wherein the smartphone app is password protected.

18. The method of claim 9, further comprising the step of providing a second wireless device which communicates with the first wireless device.

19. The method of claim 18, wherein the second wireless device monitors compliance with the boundary map.

20. The method of claim 18, wherein the boundary map may be altered from the second wireless device.

21. The method of claim 18, wherein an alert is sent to the second wireless device when the vehicle is not in compliance with the boundary map.

22. The method of claim 18, wherein an app is provided on the second wireless device which displays the boundary map and the vehicle location on the map.

23. A vehicle control system for modifying vehicle operation, comprising:

an electronic control unit having at least one processor;

a vehicle network;

a first wireless device having a GPS module, a local wireless communication module, and a distance wireless communication module;

a wireless communication module operable to communicate with the first wireless device;

a memory accessible by the processor and memory having software stored thereon, the software being configured for execution by the processor and including instructions for providing a boundary map inside of which the vehicle operates under normal operating conditions, whereby the vehicle enters a degraded vehicle mode that in some way limits operation of vehicle when the GPS module is outside the boundary map.

24. The vehicle control system of claim 23, wherein when GPS module is inside the boundary map, first wireless device communicates to the electronic control unit and sends a signal indicating compliance with the boundary condition.

25. The vehicle control system of claim 23, and at least one display for communicating information to a user regarding vehicle operating parameters.

26. The vehicle control system of claim 23, wherein the degraded mode is a predetermined maximum speed limit.

27. The vehicle control system of claim 26, wherein the electronic control unit controls a throttle setting on the vehicle to limit speed.

28. The vehicle control system of claim 23, comprising a gauge having the wireless communication module.

29. The vehicle control system of claim 28, wherein the gauge further comprises at least one display for communicating information to a user regarding vehicle operating parameters.

* * * * *